Sept. 21, 1965 G. D. SMITH 3,207,973
D.C. REGULATED POWER SUPPLY EMPLOYING MEANS FOR ADJUSTING
THE INPUT IN RESPONSE TO OUTPUT VOLTAGES VARIATIONS
Filed June 23, 1961 2 Sheets-Sheet 1

INVENTOR.
GAIL D. SMITH
BY W. O. Quesenberry
O. E. Hodges
ATTYS

Sept. 21, 1965 G. D. SMITH 3,207,973
D.C. REGULATED POWER SUPPLY EMPLOYING MEANS FOR ADJUSTING
THE INPUT IN RESPONSE TO OUTPUT VOLTAGES VARIATIONS
Filed June 23, 1961 2 Sheets-Sheet 2

INVENTOR.
GAIL D. SMITH

ATTYS.

United States Patent Office 3,207,973
Patented Sept. 21, 1965

3,207,973
D.C. REGULATED POWER SUPPLY EMPLOYING MEANS FOR ADJUSTING THE INPUT IN RESPONSE TO OUTPUT VOLTAGES VARIATIONS
Gail D. Smith, Rockville, Md., assignor to the United States of America as represented by the Secretary of the Navy
Filed June 23, 1961, Ser. No. 119,246
1 Claim. (Cl. 321—18)
(Granted under Title 35, U.S. Code (1952), sec. 266)

The invention described herein may be manufactured and used by or for the Government of the United States of America for governmental purposes without the payment of any royalties thereon or therefor.

This invention relates to a voltage supply circuit and more particularly to a series element voltage regulated power supply.

A series element voltage regulated power supply maintains a given output voltage by providing a control element in series with the output element and controlling the resistance of the series element in accordance with the desired amplitude of the output voltage. Most commonly a fixed reference voltage is compared with the voltage drop across a portion of the output element and the difference between the two is amplified and used to control the resistance of the control element to maintain a given output voltage. Thus, when the output voltage exceeds the desired amplitude, a difference signal is generated and applied to the control element to increase the resistance of the control element; when the output voltage is too low, the resistance of the control element is decreased. Thus, the control element acts automatically to provide the proper voltage drop across the circuit between the input voltage and the output voltage.

It is desirable in voltage supply circuits to provide a means for varying the amplitude of the output voltage. In the prior art, such a means usually took the form of a potentiometer or rheostat with a movable tap thereon as the element across which the output voltage was developed. The position of the tap on the potentiometer determined that portion of the total output to be compared with the fixed reference voltage. Thus, the output voltage might be lowered by comparing a larger proportion of the output voltage drop with the fixed reference voltage thereby causing the resistance of the series control element to increase. In the prior art, however, the output voltage did not vary in linear relation with corresponding linear movements of the rheostat tap, such a linear variation is highly desirable in a voltage supply so that the user thereof may obtain a given output voltage by reference to a linearly calibrated dial on the rheostat rather than relying upon a hit and miss determination of the non-linear response.

Another problem encountered in the prior art was the limitations placed upon the voltage supply by the power dissipating capabilities of the series control element. Since the series control element must provide a voltage drop equal to the difference between the output voltage and the input voltage, the voltage supply will be able to provide only a small amount of current to a load at low output voltages as compared with the relatively large amount of current which may be provided at high output voltages. For example, consider a series element with a maximum one watt power dissipating capability, an input voltage of 52 volts and the desired output voltages of two and 50 volts. When the output voltage is two volts, it is necessary that a 50 volt drop occur across the series element; with 50 volts across the series element, the series element may only pass 20 milliamperes if it is not to exceed the one watt dissipation capability. When the output voltage is 50 volts, only two volts need be dissipated across the series element; with only the two volt drop, the series element may pass 500 milliamperes to the load before the one watt limit is exceeded. It is desirable, therefore, to have the input voltage lowered or raised in response to a lowering or raising of the output voltage. By changing the input voltage in accordance with the output voltage, the series element need not provide large voltage drops when small output voltages are desired. Such an arrangement also raises the efficiency of the voltage supply circuit by not dissipating large amounts of power in the series element. Maximum efficiency is attained by maintaining a constant voltage drop across the series element throughout the full range of voltages, such constant voltage drop being the minimum allowable across the series element.

It is an object of this invention to provide a series element direct current voltage regulated power supply with a linear output voltage control which enables simultaneous control of input and output voltage by the use of a linearly calibrated dial for setting the output voltage.

Another object of the invention is to provide a series element direct current voltage regulated power supply with a variable voltage range which can deliver a maximum amount of current with uniform efficiency over the entire voltage range.

Various other objects and many advantages will be apparent from the following description of one embodiment of the invention, and the novel features will be particularly pointed out hereinafter in connection with the appended claims.

Figure 1:
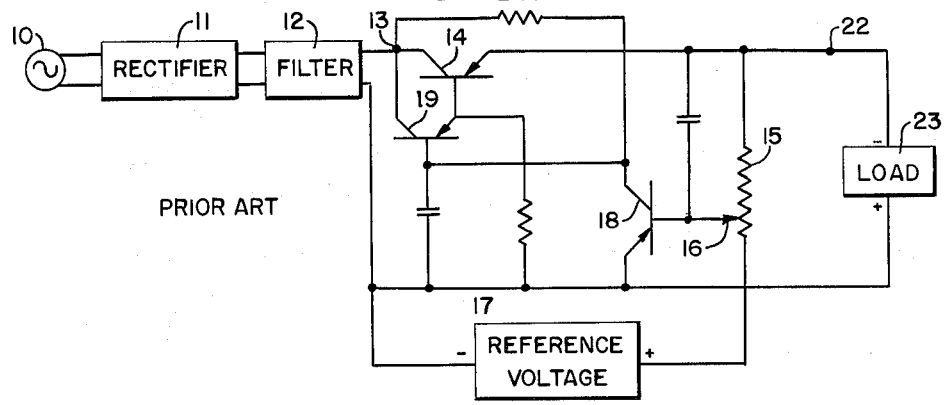
FIG. 1 illustrates a series element direct current voltage regulated power supply according to the prior art.

Referring now to FIG. 1, a source of alternating current 10 is connected to a rectifier 11 and filter 12 to provide a direct current input voltage at terminal 13. The source of input voltage 13 is connected to the collector of a p-n-p transistor 14, which comprises the series control element whose resistance is controlled by the voltage applied to the base thereof. The emitter of transistor 14 is connected in series with a variable potentiometer 15 having a voltage tap 16 thereon; the potentiometer 15 is connected in turn to the reference voltage source 17 of positive polarity. The rheostat tap 16 is connected to the base of transistor 18, which is used as a comparing means. The output of comparing transistor 18 is amplified by the amplifier 19 and applied to the base of the series control element 14 to control the impedance thereof. Attached to the output terminal 22 is the load 23 to which the output voltage is supplied. In operation, the voltage drop across that portion of the output resistor potentiometer 15 below the tap 16, as viewed in the drawing, is in effect compared with the reference voltage 17. When the voltage drop on the lower portion of the potentiometer is equal to the positive reference voltage, the tap 16 is at ground potential. If this voltage drop is not equal to the reference voltage a difference voltage of one polarity or the other is applied to the base of the comparing transistor 18. The transistor 18 develops a difference signal which is applied to amplifier 19 and thence to the base of the series control element 14 to vary the resistance thereof. If the voltage drop across the portion of the rheostat below the tap 16 exceeds the reference voltage a signal is generated increasing the resistance of the series control element 14; the voltage drop across the series control element 14 is thereby increased thus lowering the potential at the output terminal 22 and the voltage drop across the lower portion of the rheostat. An opposite effect is produced when the voltage existing at tap 16 is of the opposite polarity. Thus, the voltage appearing at output terminal 22 is maintained at a constant value for a given setting of the rheostat tap 16.

It is possible with a single fixed input voltage to obtain different values of output voltage by varying the position of the tap 16 on the rheostat 15. During proper operation of the device, the potential at tap 16 is maintained at ground level. Thus, the potential appearing at output terminal 22 is the voltage developed across the upper portion of the rheostat resistance 15. Thus, as the tap is moved upward on the rheostat 15 a greater proportion of the entire resistance is required below the tap to equal the reference voltage resulting in a smaller voltage drop across the decreased portion of the rheostat above the tap.

In the circuit of FIG. 1, the output voltage does not vary linearly with linear changes of position of the tap 16 upon the control potentiometer 15. Analyzing the circuit of FIG. 1, a symbolic equation may be developed for the total voltage appearing across the resistance of the rheostat 15, which is the sum of the reference voltage and the output voltage, and may be given by the equation:

$$V_O + V_R = IR = I[KR + (1-K)R] \quad (1)$$

in which $V_O$ represents the output voltage; $V_R$ represents the reference voltage; $I$ represents the current through the rheostat resistance represented by $R$; $K$ represents the proportion of the total resistance $R$ above the tap 16 and $(1-K)$ represents the proportion of the resistance $R$ below the tap 16. Assuming the base to emitter voltage is zero, then $$V_R = IR(1-K) \text{ or } I = \frac{V_R}{(1-K)R} \quad (2)$$

Inserting Equation 2 in Equation 1, $$V_O + V_R = \frac{V_R}{(1-K)R}[KR + (1-K)R] \quad (3)$$

Now solving for the output voltage $V_O$, $$V_O = V_R \frac{K}{(1-K)} \quad (4)$$

This equation indicates, as aforestated, that the output voltage $V_O$ is not linear with linear variations of K. This nonlinear variation is shown graphically in FIG. 2 by the output voltage curve 24. Further, nonlinearities in the response of the circuit of FIG. 1 are introduced by having the collectors of the transistors 18 and 19 connected across the unregulated input voltage. The operating characteristics of the transistors will change with changes in the input voltage since they depend on the input voltage for their collector bias.

Figure 2:
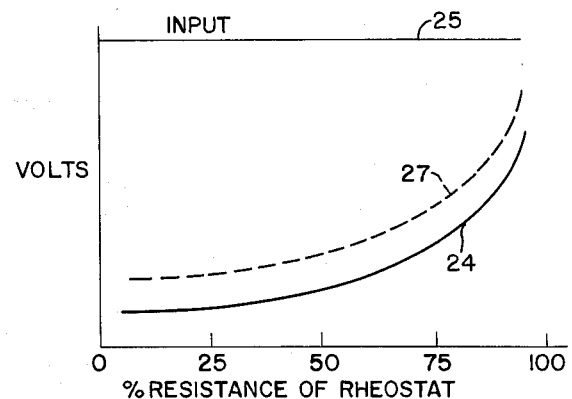
FIG. 2 is a graphical illustration of the operation of the circuit of FIG. 1.

Referring now to FIG. 2, in which a fixed input voltage is represented by line 25, it is to be noted that the voltage difference between the input and the output voltage for different settings of the potentiometer varies greatly. It is necessary for this difference to be dissipated by the series element 14; in other words, the resistance of the series element must be increased until a voltage drop thereacross equals the difference between the input and the output voltage. By again using the foregoing simplified illustration, it may be illustrated that the power output of the voltage supply is severely limited at low output voltages. Assuming now that series element 14 has a maximum power capability of one watt and a minimum voltage drop of two volts, and that the fixed input voltage at terminal 13 is 52 volts, it may be seen that for a desired output voltage of two volts there must be a voltage drop across series element 14 of 50 volts. The 50 volt drop across series element 14 would allow that element to pass only 20 milliamperes before reaching its power maximum of one watt. Under the same conditions, a maximum output voltage of 50 volts would require only a two volt drop across element 14 thereby allowing that element to pass 500 milliamperes of current to the load before exceeding its one watt capability. A typical output curve for this type operation is shown by the curve 26 in the output current diagram of FIG. 3 which represents the maximum available output current for corresponding output voltage settings. It is desirable therefore to keep the voltage drop across element 14 at a constant minimum value by varying the input voltage in relation to changes in the output voltage as shown by the dashed input curve 27. Such an arrangement would result in a constant output current capacity throughout the entire range of output voltage, as shown by the dashed line 28 of FIG. 3. Maintaining the constant voltage drop across element 14 by varying the input voltage becomes difficult due to the nonlinearity of the output voltage, as shown by curve 24 of FIG. 2, since the input voltage must also follow the same nonlinear curve.

One method of varying the input voltage with the output voltage would be to provide a Variac with a slideable tap at the A.C. power supply 10. However, difficulty would be encountered in finding a Variac wherein linear movement of the tap thereon in concert with the linear movement of the potentiometer tap 16 would produce a nonlinear variation of voltage to follow the output curve 24. Another method would be to provide a circuit to measure the voltage drop across the element 14 and to vary the input voltage in order to maintain a constant voltage thereacross. This method requires much additional circuitry including sometimes even a servomechanism if a Variac or other mechanical means is used.

Figure 4:
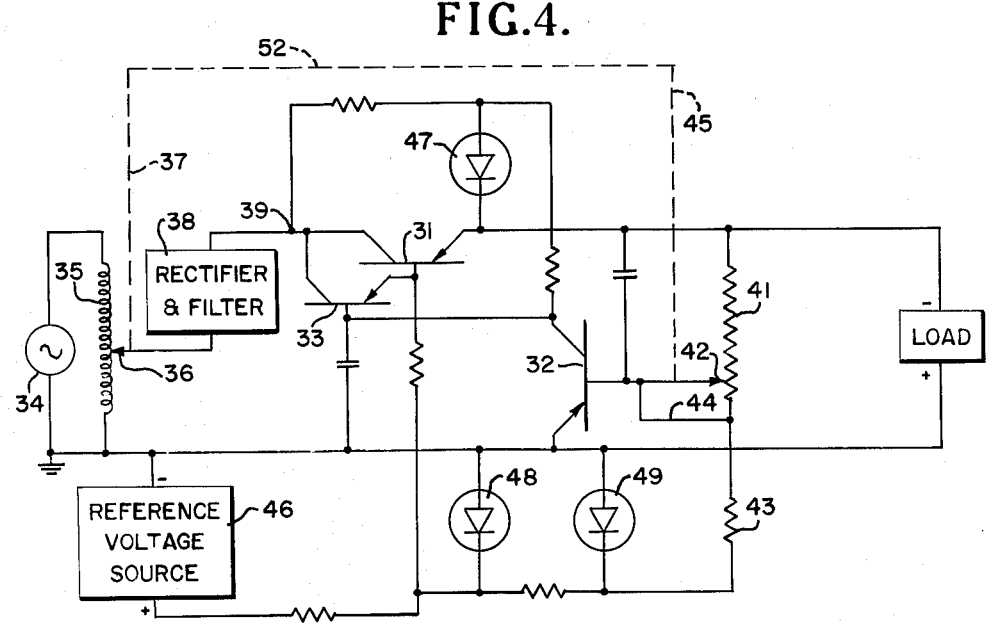
FIG. 4 illustrates a series element direct current voltage regulated power supply according to the invention.

Referring now to the circuit of FIG. 4, which illustrates one embodiment of the invention, an improved series element regulated power supply is attained. Transistor elements 31, 32 and 33 correspond to the transistors 14, 18 and 19, respectively, of FIG. 1. An A.C. source 34 is shown connected to a Variac 35 having thereon a movable tap 36 controlled by a mechanical dial means, represented schematically by dashed line 37. The voltage at tap 36 is applied through the rectifier and filter unit 38 to obtain a D.C. input voltage at input terminal 39, the voltage at input terminal 39 being applied through the series transistor element 31 to the output potentiometer 41 with tap 42 thereon. It is to be noted that tap 42 is short circuited by wire 44 with a fixed portion of the output resistance. This fixed portion may comprise a fixed terminal on the potentiometer or a separate fixed resistance 43, as illustrated. The tap 42 is movable by the mechanical dial means 45, illustrated by dashed line. The tap is connected to the comparator element 32, the output of which is connected to amplifier 33 which is in turn connected to the base of the series element 31 to control the resistance thereof.

Here it should be noted that the amplifiers 32 and 33 receive their operating power from the input voltage source at terminal 39 or from the unregulated D.C. reference voltage source 46, which may be obtained from a fixed tap on Variac 35 with a rectifier and filter.

A pair of Zener diodes 47 and 48 are connected to provide constant operating voltages from these sources even with variations of the voltages from these sources, and Zener diode 49 is connected to maintain the reference voltage at a constant level.

The operation of this circuit is generally the same as that of the circuit shown in FIG. 1. The fixed reference voltage is compared with the voltage drop across the fixed resistance 43; in equality of the two voltages produces a voltage at short circuit 44 to be applied to the base of the transistor 32 to develop a difference signal at the output thereof which is in turn amplified by the amplifier 33 and applied to the base of the series transistor element 31 to raise or lower the resistance thereof, as the case may be. However, in this circuit, linear movement of the tap 42 on the potentiometer resistance 41 produces a linear variation in the output voltage. Analyzing this feature by appropriate equations, the output voltage $V_O$ is given by the equation, $$V_O = IKR \quad (5)$$

where K equals the proportion of the resistor above the tap 42, as viewed in the drawing, and R equals the value of the total potentiometer resistance 41 and I represents the current flowing through the rheostat 41 and the fixed resistance 43. Also, $V_R$, the reference voltage is given by the equation below, in which $R_F$ is resistance 43, $$V_R = IR_F \text{ or } I = \frac{V_R}{R_F} \quad (6)$$

Inserting Equation 6 into Equation 5, it is found that, $$V_O = \frac{V_R}{R_F} KR \quad (7)$$

Figure 3:
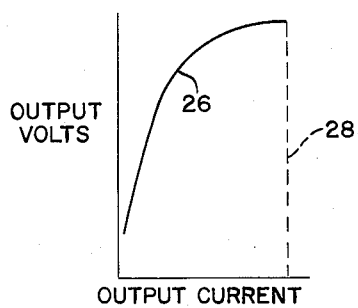
FIG. 3 is a graphical illustration of the power output capability of the circuit of FIG. 1.
Figure 5:
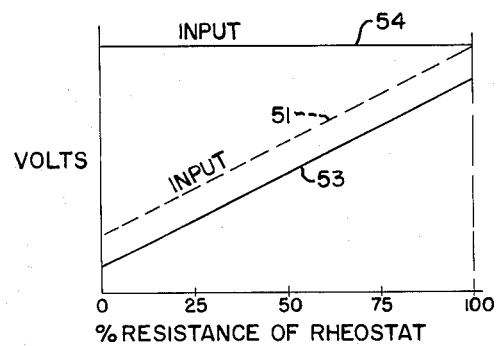
FIG. 5 is a graphical illustration of the operation of the circuit of FIG. 4.
Figure 6:
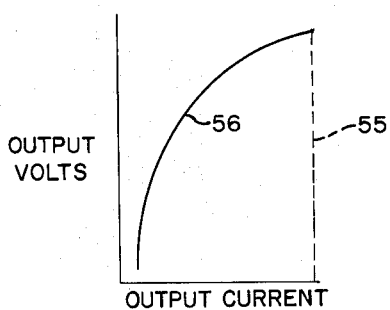
FIG. 6 is a graphical illustration of the power output capabilities of the circuit of FIG. 4.

Since R, $V_R$ and $R_F$ are fixed quantities, Equation 7 contains only two variables, $V_O$ and K. Therefore, it is noted that the output voltage varies linearly with a linear change in K. The connections of the short circuit 44 in the manner described and the connections of the elements 32 and 33 to regulated voltages with the use of Zener diodes to maintain their operating voltages results in the linear operation of the series element direct current voltage regulated power supply in the manner shown graphically in FIG. 5 by output curve 53. This linear operation obtains for either a fixed input voltage, as shown by the line 54, or a variable input voltage, as shown by the dashed line 51. The power curves shown in FIG. 6 correspond to the output curves used in explaining the circuit of FIG. 1 as illustrated in FIG. 3; the nonlinear curve 56 represents the output current capabilities of the circuit for a fixed input voltage, as represented by line 54 in FIG. 5, and dashed line 55 represents the output current capabilities of the circuit when maximum efficiency is attained by varying the input voltage, as shown by dashed line 51, in accordance with variations of the output voltage. A mechanical interconnection, represented by the dashed line 52, FIG. 4, is made between the linear dial means 37 of the Variac and the linear dial means 45 of the output potentiometer. Due to the linear operation of the voltage supply and the Variac, maximum efficiency may be attained by the simple mechanical interconnection of the two dial means such that a setting of the output potentiometer tap brings about an equal change in the input voltage from the Variac. Thus, is provided a simple series element direct current voltage regulated power supply having linear variation of the output voltage corresponding to linear variation in the potentiometer setting and maximum efficiency throughout the range of output voltage settings.

It will be understood that various changes in the details, which have been herein described and illustrated in order to explain the nature of the invention, may be made by those skilled in the art, within the principle and scope of the invention as expressed in the appended claim.

What is claimed is:

A D.C. regulated power supply comprising an A.C. input voltage source, means connected to said source for adjusting the amplitude of the input source voltage, an A.C. rectifier connected to said input voltage source, a variable output resistor, a first transistor connected in series between said output resistor and the output of said rectifier, a D.C. reference voltage source, a reference resistor connected in series between said output resistor and said reference voltage source, a second transistor connected to the junction of said reference resistor and said output resistor for comparing the voltage across said reference resistor with said reference voltage, a third transistor interconnecting said first and second transistors for applying a difference voltage to said first transistor for varying the resistance of said first transistor and thereby maintaining a constant voltage across said output resistor, means for adjusting the resistance of said variable output resistor, means mechanically connecting said first and second adjusting means for varying the input voltage in accordance with variations in the voltage across said variable output resistor, a first Zener diode connected between the output of said rectifier and said first transistor for providing a constant D.C. operating voltage at said first transistor, and a second Zener diode connected in parallel with said reference voltage for providing a constant D.C. voltage level at said reference resistor.

References Cited by the Examiner

UNITED STATES PATENTS

| 2,840,777 | 6/58 | De Blasio | 323—22 |
| 2,915,693 | 12/59 | Harrison | 323—22 |
| 2,920,265 | 1/60 | Siedband | 323—22 |
| 2,942,174 | 6/60 | Harrison | 323—22 |
| 2,981,884 | 4/61 | Tighe | 323—22 |
| 2,992,385 | 7/61 | Lingle | 323—22 |
| 3,028,538 | 4/62 | Rosenfeld | 323—22 |
| 3,117,273 | 1/64 | Magnusson | 323—22 |
| 3,138,752 | 6/64 | De Blasio | 323—22 |
| 3,161,778 | 12/64 | Harrison et al. | 323—22 |

FOREIGN PATENTS 1,225,345   6/60   France.

OTHER REFERENCES

"Voltage Regulators" by Earl Wilson, published in Electronics, Sept. 23, 1960, page 63.

LLOYD McCOLLUM, *Primary Examiner.*

ROBERT L. SIMS, *Examiner.*